US012748463B2

(12) United States Patent
Liu et al.

(10) Patent No.: US 12,748,463 B2
(45) Date of Patent: Sep. 29, 2026

(54) ELECTRONIC DEVICE

(71) Applicant: VIVO MOBILE COMMUNICATION CO., LTD., Dongguan (CN)

(72) Inventors: Xuyang Liu, Dongguan (CN); Yanwei Shang, Dongguan (CN); Wenlong Wang, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 85 days.

(21) Appl. No.: 19/013,078

(22) Filed: Jan. 8, 2025

(65) Prior Publication Data

US 2025/0147554 A1 May 8, 2025

Related U.S. Application Data

(63) Continuation of application No. PCT/CN2023/106910, filed on Jul. 12, 2023.

(30) Foreign Application Priority Data

Jul. 18, 2022 (CN) ......................... 202210843451.6

(51) Int. Cl.
*G06F 1/16* (2006.01)

(52) U.S. Cl.
CPC .......... *G06F 1/1656* (2013.01); *G06F 1/1624* (2013.01); *G06F 1/1652* (2013.01)

(58) Field of Classification Search
CPC ............................. G06F 1/1624; G06F 1/1652
See application file for complete search history.

(56) References Cited

U.S. PATENT DOCUMENTS

| | | | | |
|---|---|---|---|---|
| 2019/0305237 | A1* | 10/2019 | Shin | G06F 3/0488 |
| 2020/0315036 | A1* | 10/2020 | Ahn | G06F 1/1652 |
| 2021/0181801 | A1 | 6/2021 | Yin | |
| 2022/0117100 | A1 | 4/2022 | Yoon et al. | |

FOREIGN PATENT DOCUMENTS

| | | | |
|---|---|---|---|
| EP | 4187350 | A1 | 5/2023 |
| WO | 2022050585 | A1 | 3/2022 |

* cited by examiner

*Primary Examiner* — Jerry Wu
(74) *Attorney, Agent, or Firm* — The Webb Law Firm

(57) ABSTRACT

An electronic device includes a first screen support, a second screen support, a flexible screen, and an auxiliary extending/retracting mechanism. The first screen support and the second screen support are configured to be movable relative to each other and cooperate with each other. The auxiliary extending/retracting mechanism includes a first transmission member, a second transmission member, a third transmission member, and an elastic member. The first transmission member is fixedly connected to the second screen support and is located on a side of the second screen support facing away from the flexible screen. The second transmission member is rotatably connected to the first screen support. The third transmission member is slidably connected to the first screen support or the second screen support. The first transmission member cooperates with the second transmission member. The second transmission member cooperates with the third transmission member.

8 Claims, 2 Drawing Sheets

ELECTRONIC DEVICE

CROSS-REFERENCE TO RELATED APPLICATIONS

This application is a Bypass Continuation Application of International Patent Application No. PCT/CN2023/106910, filed Jul. 12, 2023, and claims priority to Chinese Patent Application No. 202210843451.6, filed Jul. 18, 2022, the disclosures of which are hereby incorporated by reference in their entireties.

BACKGROUND OF THE INVENTION

Field of the Invention

This application relates to the field of communication device technologies, and in particular, to an electronic device.

Description of Related Art

As the users' demand increases, the performance of electronic devices have been continuously improved, particularly, display performance of electronic devices is becoming more powerful.

Usually, an electronic device is configured with a flexible screen. The flexible screen can extend with the electronic device to present a large display interface. When a user needs a small display interface, the flexible screen can at least partially retract into the electronic device as the electronic device is folded. Such an electronic device allows for the adjustment of the size of the display interface, thereby facilitating use of the user.

SUMMARY OF THE INVENTION

Embodiments of this application provide an electronic device, including a first screen support, a second screen support, a flexible screen, and an auxiliary extending/retracting mechanism. The first screen support and the second screen support are configured to be movable relative to each other and cooperate with each other to cause the electronic device to switch between a folded state and an unfolded state. The flexible screen is arranged on the first screen support and the second screen support. A first end of the flexible screen is connected to the second screen support, and a second end of the flexible screen is bent to a side of the first screen support facing away from the first end and is arranged in the electronic device. The auxiliary extending/retracting mechanism includes a first transmission member, a second transmission member, a third transmission member, and an elastic member. The first transmission member is fixedly connected to the second screen support and is located on a side of the second screen support facing away from the flexible screen. The second transmission member is rotatably connected to the first screen support. The third transmission member is slidably connected to the first screen support or the second screen support. The second transmission member is located between the first transmission member and the third transmission member. The first transmission member cooperates with the second transmission member, and the second transmission member cooperates with the third transmission member. One end of the elastic member is connected to the third transmission member, and the other end of the elastic member is connected to the second end of the flexible screen. When the electronic device switches between the folded state and the unfolded state, the first screen support drives the second transmission member to move, the first transmission member drives the second transmission member to rotate, the second transmission member drives the third transmission member to move in a movement direction of the first screen support, and the third transmission member drives, via the elastic member, the second end of the flexible screen to move.

DESCRIPTIONS OF REFERENCE NUMERALS

110—First screen support; 111—Guide rail; 120—Second screen support; 200—Flexible screen; 300—Auxiliary extending/retracting mechanism; 310—First transmission member; 320—Second transmission member; 321—First gear; 322—Second gear; 323—First rotating wheel; 324—Second rotating wheel; 325—Transmission belt; 330—Third transmission member; 341—Elastic member; 342—Mounting housing; 343—Sliding block; 344—Guide shaft; 350—Mounting support; 351—First guide groove; 352—Second guide groove; 360—Screen connecting member; 410—First housing; 420—Second housing; and 500—Movement shaft.

DESCRIPTION OF THE INVENTION

The technical solutions in embodiments of this application are clearly described below with reference to the accompanying drawings in embodiments of this application. Apparently, the described embodiments are merely some rather than all of embodiments of this application. All other embodiments obtained by a person of ordinary skill in the art based on embodiments of this application shall fall within the protection scope of this application.

In the specification and claims of this application, the terms "first", "second", and the like are used to distinguish similar objects, but are not used to describe a specific sequence or order. It is to be understood that such used data is interchangeable where appropriate, so that embodiments of this application can be implemented in an order other than those illustrated or described here. In addition, "and/or" in the specification and claims represents at least one of connected objects, and the character "/" generally represents that the preceding and latter associated objects are in an "or" relation.

Usually, a tension spring is provided inside the electronic device. One end of the tension spring is connected to one end of the flexible screen, and the other end of the tension spring is connected to a housing of the electronic device. The tension spring tensions the screen, so that wrinkling is less likely to occur on the screen during unfolding and folding of the flexible screen.

However, during the unfolding of the flexible screen of the electronic device, as the unfolded surface of the flexible screen increases, tensile force exerted by the flexible screen on the tension spring also gradually increases. Accordingly, the tensile force on the flexible screen is high, and consequently, a risk of damage to the flexible screen is increased, leading to poor safety of the electronic device.

An electronic device according to an embodiment of this application is described below by using embodiments and application scenarios thereof with reference to the accompanying drawings.

Figure 1:
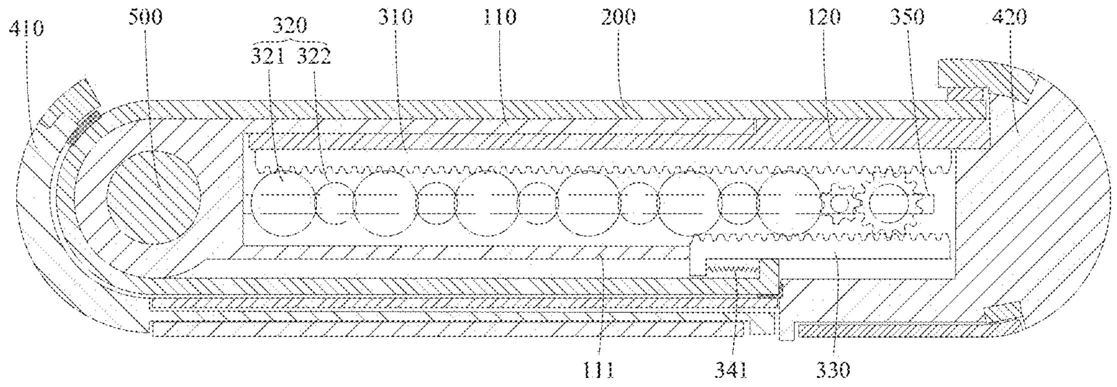
FIG. 1 is a schematic diagram of a structure of a first electronic device according to an embodiment of this application.
Figure 2:
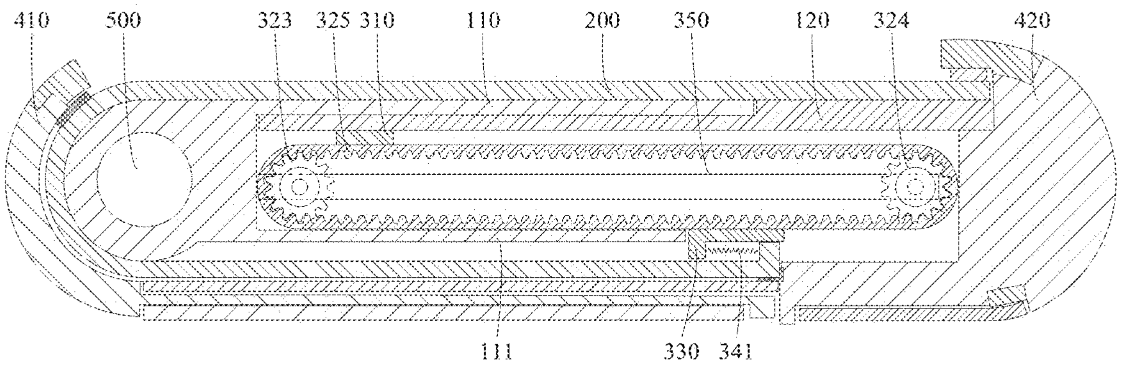
FIG. 2 is a schematic diagram of a structure of a second electronic device according to an embodiment of this application.
Figure 3:
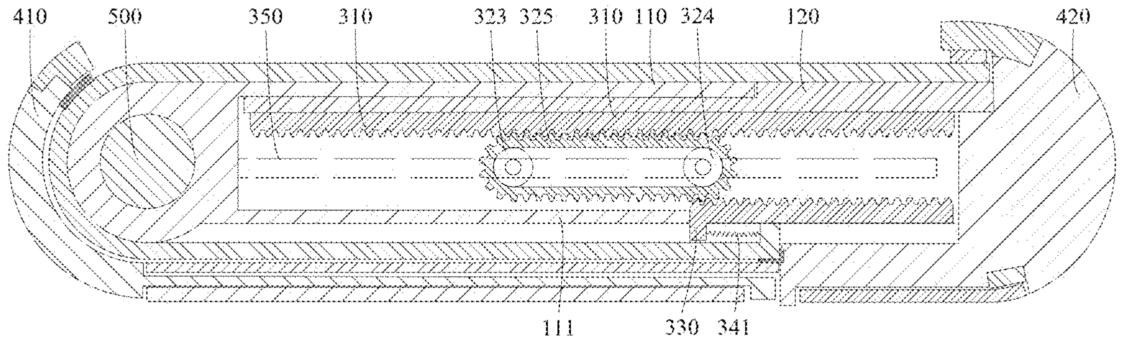
FIG. 3 is a schematic diagram of a structure of a third electronic device according to an embodiment of this application.
Figure 4:
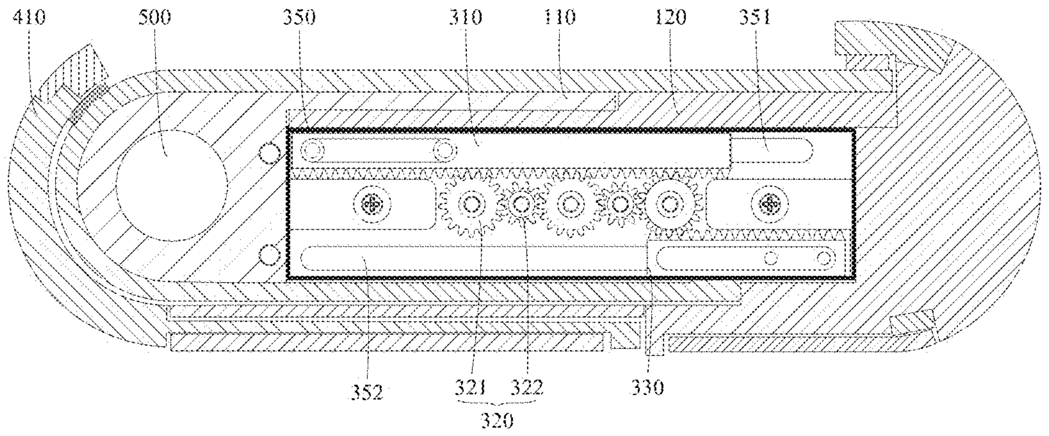
FIG. 4 is a schematic diagram of a structure of a fourth electronic device according to an embodiment of this application.
Figure 5:
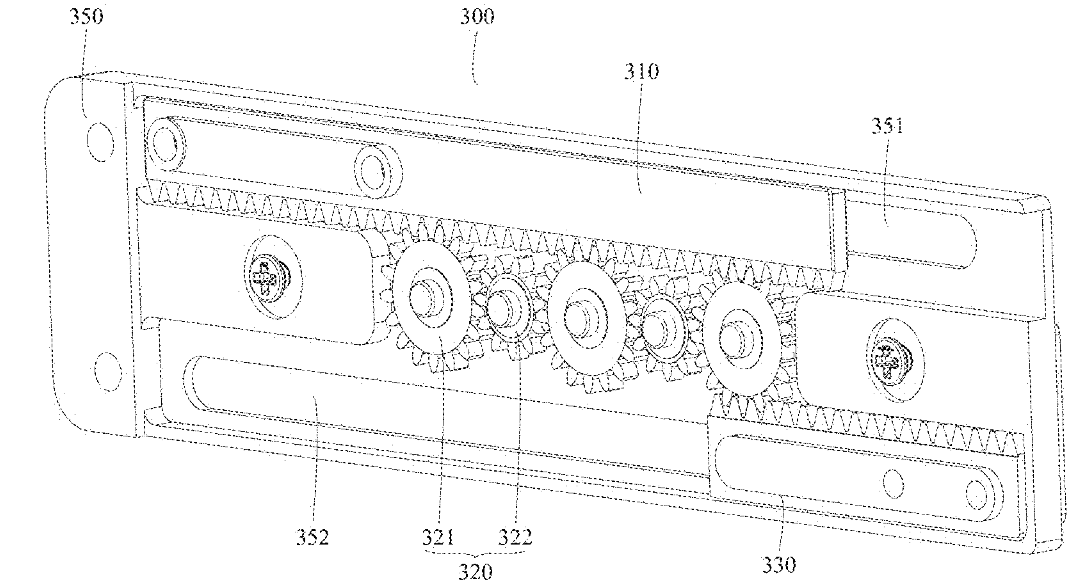
FIG. 5 and FIG. 6 are schematic diagrams of a structure of an auxiliary extending/retracting mechanism in a fourth electronic device according to an embodiment of this application.
Figure 6:
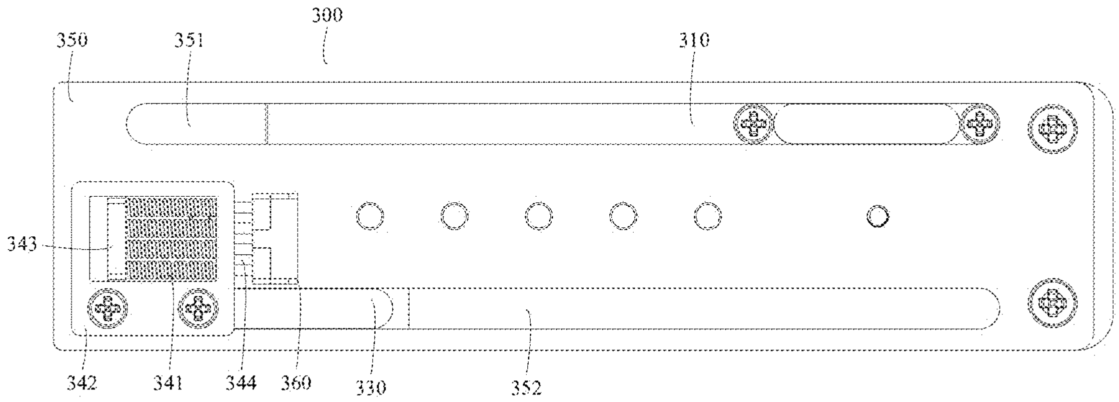

Refer to FIG. 1 to FIG. 6. An embodiment of this application discloses an electronic device. The disclosed electronic device includes a first screen support 110, a second screen support 120, a flexible screen 200, and an auxiliary extending/retracting mechanism 300.

The flexible screen 200 is arranged on the first screen support 110 and the second screen support 120, and the first screen support 110 and the second screen support 120 are configured to support the flexible screen 200. The first screen support 110 and the second screen support 120 are configured to be movable relative to each other and cooperate with each other to cause the electronic device to switch between a folded state and an unfolded state. A first end of the flexible screen 200 is connected to the second screen support 120, and a second end of the flexible screen 200 is bent to a side of the first screen support 110 facing away from the first end and is arranged in the electronic device.

Optionally, the first screen support 110 and the second screen support 120 may move away from each other to cause the electronic device to be gradually unfolded until the electronic device is in the unfolded state. In this case, the flexible screen 200 is extended and unfolded as the first screen support 110 and the second screen support 120 move away from each other, so that a display interface of the electronic device is increased. The first screen support 110 and the second screen support 120 may move close to each other to cause the electronic device to be gradually folded until the electronic device is in the folded state. In this case, the flexible screen 200 is bent and retracted as the first screen support 110 and the second screen support 120 move close to each other, so that the display interface of the electronic device is reduced.

In a working process, the flexible screen 200 is extended and unfolded as the first screen support 110 and the second screen support 120 move away from each other. The first end of the flexible screen 200 is connected to the second screen support 120 and cannot be moved. In this case, to facilitate unfolding or bending of the flexible screen, the second end is a movable end and moves in a direction of unfolding or retracting.

The auxiliary extending/retracting mechanism 300 includes a first transmission member 310, a second transmission member 320, a third transmission member 330, and an elastic member 341. The first transmission member 310 is fixedly connected to the second screen support 120 and is located on a side of the second screen support 120 facing away from the flexible screen 200. The second transmission member 320 is rotatably connected to the first screen support 110. The third transmission member 330 is slidably connected to the first screen support 110 or the second screen support 120. The second transmission member 320 is located between the first transmission member 310 and the third transmission member 330. The first transmission member 310 cooperates with the second transmission member 320, and the second transmission member 320 cooperates with the third transmission member 330. One end of the elastic member 341 is connected to the third transmission member 330, and the other end of the elastic member 341 is connected to the second end of the flexible screen 200. In this case, when the first screen support 110 and the second screen support 120 are relatively stationary, the elastic member 341 may be in a stretched or compressed state, so that the elastic member 341 can tension the flexible screen 200, and wrinkling is less likely to occur on the flexible screen 200.

When the electronic device switches between the folded state and the unfolded state, the first screen support 110 drives the second transmission member 320 to move. In this case, the first screen support 110 is a movable component, and the second screen support 120 is a fixed component. The first transmission member 310 drives the second transmission member 320 to rotate, the second transmission member 320 drives the third transmission member 330 to move in a movement direction of the first screen support 110, and the third transmission member 330 drives, via the elastic member 341, the second end of the flexible screen 200 to move. When the first screen support 110 moves, the third transmission member 330 and the second end of the flexible screen 200 move simultaneously. Accordingly, the third transmission member 330 drives, via the elastic member 341, the second end of the flexible screen 200 to move. Alternatively, it may be understood as that the third transmission member 330 and the second end of the flexible screen 200 jointly drive the clastic member 341 to move.

Because the movement of the third transmission member 330 and the second end of the flexible screen 200 is driven by the movement of the first screen support 110, a change in a length of the elastic member 341 is small during the unfolding or folding of the electronic device.

Optionally, the first screen support 110 may be connected to the second screen support 120 via a sliding rail. The first screen support 110 may alternatively be rollingly connected to the second screen support 120. For example, the first screen support 110 and the second screen support 120 may move relative to each other by using balls. Certainly, the movable cooperation between the first screen support 110 the second screen support 120 is not limited to be implemented in the foregoing manner, and may alternatively be implemented in another manner.

During the unfolding of the electronic device, when the electronic device switches from the folded state to the unfolded state, the first screen support 110 drives the second transmission member 320 to move in a first direction. Because the first transmission member 310 is fixed on the second screen support 120, the first transmission member 310 cannot move. Reaction force exerted by the first transmission member 310 on the second transmission member 320 drives the second transmission member 320 to rotate in a first rotation direction, and force applied by the second transmission member 320 to the third transmission member 330 causes the third transmission member 330 to move. The third transmission member 330 drives one end of the clastic member 341 to move, and the other end of the clastic member 341 drives the second end of the flexible screen 200 to move. In this case, the clastic member 341 moves in the first direction as the flexible screen 200 is unfolded, and the clastic member 341 moves along with the first screen support 110, leading to small deformation of the clastic member 341. During the unfolding of the flexible screen 200, tensile force exerted by the clastic member 341 on the flexible screen is small. When the clastic member 341 drives the second end of the flexible screen 200 to move, the clastic member 341 may be deformed by a minimal distance during initial movement of the third transmission member 330. When the second end is pushed to move, the tensile force exerted by the clastic member 341 on the screen does not change as the flexible screen 200 is unfolded. Therefore, the force exerted by the clastic member 341 on the screen is constant during the unfolding of the screen.

During the folding of the electronic device, when the electronic device switches from the unfolded state to the folded state, the first screen support 110 drives the second transmission member 320 to move in a second direction. Because the first transmission member 310 is fixed on the second screen support 120, the first transmission member 310 cannot move. Reaction force exerted by the first transmission member 310 on the second transmission member 320 drives the second transmission member 320 to rotate in a second rotation direction, and force applied by the second transmission member 320 to the third transmission member 330 causes the third transmission member 330 to move. The third transmission member 330 drives one end of the elastic member 341 to move, and the other end of the clastic member 341 drives the second end of the flexible screen 200 to move. In this case, the clastic member 341 moves in the second direction as the flexible screen 200 is unfolded, and the clastic member 341 moves along with the first screen support 110, leading to small deformation of the elastic member 341. During the folding of the flexible screen 200, tensile force exerted by the clastic member 341 on the flexible screen is small. When the clastic member 341 drives the second end of the flexible screen 200 to move, the clastic member 341 may be deformed by a minimal distance during initial movement of the third transmission member 330. When the second end is pushed to move, the tensile force exerted by the elastic member 341 on the screen does not change as the flexible screen 200 is unfolded. Therefore, the force exerted by the elastic member 341 on the screen is constant during the folding of the screen.

In the foregoing embodiment, the elastic member 341 tensions the flexible screen 200. When the electronic device switches between the unfolded state and the folded state, the tensile force exerted by the elastic member 341 on the flexible screen 200 changes slightly or the tensile force is constant.

In the foregoing embodiment, the first direction is a direction in which the first screen support 110 moves away from the second screen support 120, and the second direction is a direction in which the first screen support 110 moves close to the second screen support 120. Therefore, the first direction and the second direction are opposite directions, and the foregoing first rotation direction and the second rotation direction are also opposite directions.

In embodiments disclosed in this application, the first screen support 110 is slidably connected to the third transmission member 330. When the first screen support 110 moves, the second transmission member 320 and the first transmission member 310 drive the clastic member 341 to move. In this case, during the unfolding or bending of the flexible screen 200, the elastic member 341 also moves accordingly, leading to small deformation of the elastic member. During the unfolding or retracting of the flexible screen, the tensile force exerted by the elastic member 341 on the flexible screen is small, so that a risk of damage to the flexible screen 200 is reduced, thereby enhancing safety of the electronic device.

In addition, when the electronic device switches between the folded state and the unfolded state, constant force acts on the elastic member 341, so that service life of the elastic member 341 is prolonged.

In addition, during the unfolding or bending, the flexible screen 200 does not need to overcome additional resistance generated by spring tensile force, so that service life of a driving motor configured to drive the electronic device to unfold or fold can be prolonged, and energy consumption of the electronic device is reduced.

In the foregoing embodiment, the electronic device disclosed in this application may further include a first housing 410, a second housing 420, and a movement shaft 500. The first housing 410 and the second housing 420 define a mounting space. The first screen support 110, the second screen support 120, and the auxiliary extending/retracting mechanism 300 may all be located in the mounting space. The first housing 410 is fixedly connected to the first screen support 110, and the second housing 420 is fixedly connected to the second screen support 120. In this case, the first housing 410 may move relative to the second housing 420, so that the electronic device can switch between the folded state and the unfolded state. The movement shaft 500 is rotatably connected to the first screen support 110, and the movement shaft 500 is configured to drive the first screen support 110 to move. Alternatively, the second screen support 120 is provided with a rack. An end of the movement shaft 500 is meshed with the rack. The driving motor drives the movement shaft 500 to rotate. Reaction force exerted by the rack of the second screen support 120 on the movement shaft 500 drives the movement shaft 500 to move in an extension direction of the rack, so as to drive the first screen support 110 to move. Certainly, a driving manner in this application is not limited to a manner in which the movement shaft 500 is driven to drive the first screen support 110 to move. Alternatively, the second transmission member 320 is driven, so that the electronic device can switch between the unfolded state and the folded state.

Certainly, the electronic device may alternatively switch between the folded state and the unfolded state based on a manual operation by a user. When the electronic device switches from the folded state to the unfolded state, the user may pull the first screen support 110 outward. When the electronic device switches from the unfolded state to the folded state, the user may push the first screen support 110 inward.

In the foregoing embodiment, the second transmission member 320 may be directly mounted on the first screen support 110. However, this may result in a larger size of the first screen support 110.

In view of this, in another optional embodiment, the auxiliary extending/retracting mechanism 300 may further include a mounting support 350. The mounting support 350 may be fixedly connected to the first screen support 110, and the second transmission member 320 is rotatably connected to the mounting support 350. In this solution, the second transmission member 320 is connected to the first screen support 110 via the mounting support 350, so that the size of the first screen support 110 can be designed to be small, thereby reducing a size of the electronic device.

In the foregoing embodiment, the mounting support 350 may be a rod-shaped structural member or a strip-shaped structural member. A specific structure of the mounting support 350 is not limited herein.

To simplify the assembly structure of the electronic device, in another optional embodiment, the mounting support 350 is slidably connected to the first transmission member 310 and the third transmission member 330. The mounting support 350 is provided with a first guide groove 351 and a second guide groove 352 extending side by side in the movement direction of the first screen support 110. The first transmission member 310 is located in the first guide groove 351 and slidably cooperates with the first guide groove 351. The third transmission member 330 is located in the second guide groove 352 and slidably cooperates with the second guide groove 352.

In this solution, the mounting support 350 is provided with the first guide groove 351 and the second guide groove 352. In this case, the first transmission member 310 and the third transmission member 330 may be slidably connected to the mounting support 350. Therefore, in the auxiliary extending/retracting mechanism 300, the first transmission member 310, the second transmission member 320, and the third transmission member 330 may form an integrated mechanism via the mounting support 350, to implement modularization of the auxiliary extending/retracting mechanism 300, and facilitate the assembly of the electronic device, so that the electronic device has a simple assembly structure for convenient assembly.

Optionally, the mounting support 350 may be fixedly connected to the first screen support 110 via threading, snapping, welding, magnetic attraction, or the like. The first transmission member 310 may be connected to the second screen support 120 via screwing, snapping, welding, or the like.

In another optional embodiment, the auxiliary extending/retracting mechanism 300 may further include a mounting housing 342, a sliding block 343, and a guide shaft 344. The mounting housing 342 is fixedly connected to the third transmission member 330, and the mounting housing 342 may be provided with an accommodating space. The sliding block 343 and the elastic member 341 may be located in the accommodating space. One end of the elastic member 341 may be connected to the sliding block 343, and the other end of the elastic member 341 may be connected to the mounting housing 342. A part of the guide shaft 344 is arranged in the accommodating space. The elastic member 341 is sleeved on the guide shaft 344. One end of the guide shaft 344 is connected to the sliding block 343, and the other end of the guide shaft 344 is connected to the second end of the flexible screen 200. In this case, the third transmission member 330 applies force on the guide shaft 344, and because one end of the guide shaft 344 is connected to the sliding block 343, the sliding block 343 compresses or stretches the elastic member 341.

In this solution, the guide shaft 344 can limit a direction of the elastic member 341 to avoid deviation of the clastic member 341, so as to avoid the deviation of the tensile force exerted by the clastic member 341 on the flexible screen 200 and prevent the flexible screen 200 from being pulled to one side. In addition, the clastic member 341 is located in the accommodating space of the mounting housing 342. The mounting housing 342 can protect the clastic member 341, thereby preventing the elastic member 341 from interfering or colliding with other components of the electronic device, and enhancing safety and reliability of the electronic device.

In the foregoing embodiment, small ends of guide shaft 344 make it difficult to be connected to the flexible screen 200. In view of this, in another optional embodiment, the auxiliary extending/retracting mechanism 300 may further include a screen connecting member 360. The screen connecting member 360 is connected to one end of the guide shaft 344. The screen connecting member 360 is provided with a connecting groove. The second end of the flexible screen 200 may be provided with a connecting protrusion, and the connecting protrusion is at least partially located in the connecting groove. In this solution, the screen connecting member 360 is arranged at one end of the guide shaft 344, so that a connection area between the flexible screen 200 and the guide shaft 344 is increased, thereby simplifying the connection of the flexible screen 200. In addition, the connecting protrusion of the flexible screen 200 may be directly inserted into the connecting groove of the screen connecting member 360, to simplify the assembly of the electronic device.

In another optional embodiment, the auxiliary extending/retracting mechanism 300 may include a plurality of clastic members 341 arranged at intervals and a plurality of guide shafts 344 arranged at intervals. The plurality of elastic members 341 may cooperate with the plurality of guide shafts 344 in one-to-one correspondence, and the plurality of guide shafts 344 are connected to the screen connecting member 360. In this solution, there are a plurality of elastic members 341, and this ensures that the force exerted on the flexible screen 200 is relatively uniform, so that tension performance of the flexible screen 200 is improved.

In the foregoing embodiment, if the third transmission member 330 is deviated during movement, the deviation is likely to cause a change in a direction of elastic force of the clastic member 341. Accordingly, a direction of the tensile force exerted by the elastic member 341 on the flexible screen 200 changes, and consequently, a risk of damage to the flexible screen 200 is increased, resulting in reduction of safety of the flexible screen 200. In view of this, in another optional embodiment, the first screen support 110 may be provided with a guide rail 111, and the third transmission member 330 cooperates with the guide rail 111 in a guiding manner in the movement direction of the first screen support 110. In this solution, the guide rail 111 can guide the third transmission member 330, to enhance movement accuracy of the third transmission member 330 and avoid the deviation of the third transmission member 330, thereby improving safety performance of the flexible screen 200.

In another optional embodiment, the first transmission member 310 may be a first rack, the second transmission member 320 may be a gear set, the third transmission member 330 may be a second rack, and the gear set may be meshed with the first rack and the second rack. In this solution, slippage is less likely to occur during mesh transmission between the gears and the racks, so that the auxiliary extending/retracting mechanism 300 has high reliability. In addition, the mesh transmission between the gears and the racks further has advantages in high transmission efficiency, long working life, smooth transmission, and a constant instantaneous transmission ratio.

Optionally, the gear set may include a plurality of first gears 321, the plurality of first gears 321 may be sequentially arranged in the movement direction of the first screen support 110, and the second rack is meshed with at least one of the first gears 321. In this solution, during movement, the second rack can be alternately meshed with the first gears 321 for transmission, so that a moving range of the second rack is increased, to facilitate the switch of the electronic device between the unfolded state and the folded state. In addition, the plurality of first gears 321 are designed to enable the second rack to be always meshed with at least one of the first gears 321 during movement, so that the second rack is less likely to separate from the first gear 321.

In the foregoing embodiment, the second rack is driven by the first gears 321 that are meshed with the second rack, and the first gears 321 that are not meshed with the second rack idle, so that transmission efficiency of the gear set is reduced. In view of this, in another optional embodiment, the gear set may further include a plurality of second gears 322. The first gears 321 may be meshed with the second gears 322, and a diameter of each of the first gears 321 may be greater than a diameter of each of the second gears 322. The plurality of first gears 321 and the plurality of second gears 322 may be sequentially and alternately arranged in the movement direction of the first screen support 110. In this solution, the first gears 321 that are not meshed with the second rack may be transmittingly connected, via the second gears 322, to the first gear that is meshed with the second rack, so that transmission efficiency of the gear set is improved.

In another optional embodiment, the second transmission member 320 may include a first rotating wheel 323, a second rotating wheel 324, and a transmission belt 325. The first rotating wheel 323 and the second rotating wheel 324 may be rotatably connected to the first screen support 110. The transmission belt 325 may be provided over the first rotating wheel 323 and the second rotating wheel 324. The first rotating wheel 323 and the second transmission wheel are configured to support the transmission belt 325. The transmission belt 325 cooperates with the first transmission member 310 and the third transmission member 330.

In this solution, the second transmission member 320 features a simple structure and an easy assembly, so that the auxiliary unfolding mechanism is easy to manufacture and has low costs. In addition, because the transmission belt 325 has a large contact surface, slippage is less likely to occur between the transmission belt 325 and both the first transmission member 310 and the second transmission member 320.

In another optional embodiment, the first transmission member 310 may be a third rack, and the third transmission member 330 may be a fourth rack. The transmission belt 325 may include an outer side surface and an inner side surface opposite to the outer side surface. The outer side surface may be a first toothed surface, and the first toothed surface is a surface provided with a plurality of toothed structures. The inner side surface is a first plane. The first toothed surface is meshed with the third rack and the fourth rack, and the first plane is in contact with the first rotating wheel 323 and the second rotating wheel 324.

In this solution, the inner side surface of the transmission belt 325 is of a plane structure and smooth, making it easier for the transmission belt 325 to rotate. The outer side surface of the transmission belt 325 is a toothed surface, and the toothed surface is meshed with the third rack and the fourth rack. In this way, slippage is less likely to occur, and transmission performance of the first transmission member 310, the second transmission member 320, and the third transmission member 330 is improved.

In another optional embodiment, the first transmission member 310 may be a first friction block, and the third transmission member 330 may be a second friction block. The transmission belt 325 may include an outer side surface and an inner side surface opposite to the outer side surface. The outer side surface may be a second plane, and the second plane is in contact with the first friction block and the second friction block. The inner side surface may be a second toothed surface. Each of the first rotating wheel 323 and the second rotating wheel 324 may be of a gear structure. The first rotating wheel 323 and the second rotating wheel 324 are meshed with the second toothed surface.

In this solution, the outer side surface of the transmission belt 325 is a plane and in frictional contact with the first friction block and the second friction block. Accordingly, the transmission belt 325, the first friction block, and the second friction block are driven by friction force between the transmission belt 325 and both the first friction block and the second friction block. Compared to that the outer side surface is a plane, when the outer side surface is a toothed surface, teeth tips of the gears are sharp, posing a risk of cutting circuits inside the electronic device. When the outer side surface is a plane, the risk of cutting the circuits is reduced.

In addition, the inner side surface may be the second toothed surface, each of the first rotating wheel 323 and the second rotating wheel 324 may be of the gear structure, and the first rotating wheel 323 and the second rotating wheel 324 are meshed with the second toothed surface. In this case, slippage between the inner side surface of the transmission belt 325 and both the first rotating wheel 323 and the second rotating wheel 324 can be avoided, thereby improving transmission efficiency.

The electronic device disclosed in embodiments of this application may be, for example, a smartphone, a tablet computer, an e-book reader, a wearable device (for example, a smart watch), or an electronic game consoles. A specific type of the electronic device is not limited in embodiments of this application.

Embodiments of this application have been described above with reference to the accompanying drawings. However, this application is not limited to the implementations above, and the implementations above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. An electronic device, comprising a first screen support, a second screen support, a flexible screen, and an auxiliary extending/retracting mechanism, wherein the first screen support and the second screen support are configured to be movable relative to each other and cooperate with each other to cause the electronic device to switch between a folded state and an unfolded state, the flexible screen is arranged on the first screen support and the second screen support, a first end of the flexible screen is connected to the second screen support, and a second end of the flexible screen is bent to a side of the first screen support facing away from the first end and is arranged in the electronic device; the auxiliary extending/retracting mechanism comprises a first transmission member, a second transmission member, a third transmission member, and an elastic member, the first transmission member is fixedly connected to the second screen support and is located on a side of the second screen support facing away from the flexible screen, the second transmission member is rotatably connected to the first screen support, the third transmission member is slidably connected to the first screen support or the second screen support, the second transmission member is located between the first transmission member and the third transmission member, the first transmission member cooperates with the second transmission member, the second transmission member cooperates with the third transmission member, one end of the elastic member is connected to the third transmission member, and the other end of the elastic member is connected to the second end of the flexible screen; and when the electronic device switches between the folded state and the unfolded state, the first screen support drives the second transmission member to move, the first transmission member drives the second transmission member to rotate, the second transmission member drives the third transmission member to move in a movement direction of the first screen support, and the third transmission member drives, via the elastic member, the second end of the flexible screen to move; and wherein the first transmission member is a firs track, the second transmission member is a gear set, the third transmission member is a second rack, and the gear set is meshed with the first rack and the second rack; and the auxiliary extending/retracting mechanism further comprises a mounting housing, a sliding block, and a guide shaft, the mounting housing is fixedly connected to the third transmission member, the mounting housing is provided with an accommodating space, the sliding block and the elastic member are located in the accommodating space, one end of the elastic member is connected to the sliding block, the other end of the elastic member is connected to the mounting housing, a part of the guide shaft is arranged in the accommodating space, the elastic member is sleeved on the guide shaft, one end of the guide shaft is connected to the sliding block, and the other end of the guide shaft is connected to the second end of the flexible screen.

2. The electronic device according to claim 1, wherein the auxiliary extending/retracting mechanism further comprises a mounting support, the mounting support is fixedly connected to the first screen support, and the second transmission member is rotatably connected to the mounting support.

3. The electronic device according to claim 2, wherein the mounting support is slidably connected to the first transmission member and the third transmission member, the mounting support is provided with a first guide groove and a second guide groove extending side by side in the movement direction of the first screen support, the first transmission member is located in the first guide groove and slidably cooperates with the first guide groove, and the third transmission member is located in the second guide groove and slidably cooperates with the second guide groove.

4. The electronic device according to claim 1, wherein the auxiliary extending/retracting mechanism further comprises a screen connecting member, the screen connecting member is connected to one end of the guide shaft, the screen connecting member is provided with a connecting groove, the second end of the flexible screen is provided with a connecting protrusion, and the connecting protrusion is at least partially located in the connecting groove.

5. The electronic device according to claim 4, wherein the auxiliary extending/retracting mechanism comprises a plurality of elastic members arranged at intervals and a plurality of guide shafts arranged at intervals, the plurality of elastic members cooperate with the plurality of guide shafts in one-to-one correspondence, and the plurality of guide shafts are connected to the screen connecting member.

6. The electronic device according to claim 1, wherein the first screen support is provided with a guide rail, and the third transmission member cooperates with the guide rail in a guiding manner in the movement direction of the first screen support.

7. The electronic device according to claim 1, wherein the gear set comprises a plurality of first gears, the plurality of first gears are sequentially arranged in the movement direction of the first screen support, and the second rack is meshed with at least one of the first gears.

8. The electronic device according to claim 7, wherein the gear set further comprises a plurality of second gears, the first gears are meshed with the second gears, a diameter of each of the first gears is greater than a diameter of each of the second gears, and the plurality of first gears and the plurality of second gears are sequentially and alternately arranged in the movement direction of the first screen support.

* * * * *